3,280,099
OCTAPEPTIDE DERIVATIVES AND INTERMEDIATES THERETO

Robert H. Mazur, Deerfield, and James M. Schlatter, Skokie, Ill., assignors to G. D. Searle & Co., Chicago, Ill., a corporation of Delaware
No Drawing. Filed Mar. 18, 1964, Ser. No. 352,967
4 Claims. (Cl. 260—112.5)

The present invention is concerned with novel octapeptide derivatives possessing useful pharmacological properties. They are, for example, anti-hypertensive and anti-inflammatory agents. The particular octapeptide included within the scope of this invention is prolylphenylalanylhistidylleucylleucylvalyltyrosylserine, and the instant novel derivatives are defined by the following representation

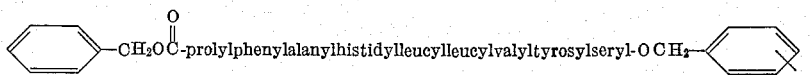

wherein X can be hydrogen or a nitro, —O—(lower alkyl), —NHCO(lower alkyl), or di-(lower alkyl)amino radical.

Examples of the lower alkyl radicals encompassed by the X substituent in the foregoing representation are methyl, ethyl, propyl, butyl, pentyl, hexyl, and the branched-chain radicals isomeric therewith.

The starting materials required for the conduct of the present invention are carbobenzoxyproline, represented by the structural formula

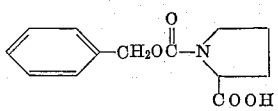

and optionally substituted benzyl esters of serine, characterized by the structural formula

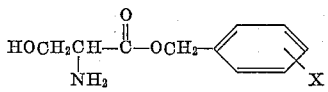

wherein X is as hereinbefore defined, together with the amino acids phenylalanine, histidine, leucine, valine, and tyrosine, in which the amino or carboxy moiety carries a suitable protecting group. Various amino acid coupling procedures known to the art may be used. The "direct" coupling method is exemplified by the reaction of carbobenzoxyphenylalanine with histidine methyl ester in the presence of dicyclohexylcarbodiimide to afford carbobenzoxyphenylalanylhistidine methyl ester. Cleavage of the carbobenzoxy protecting group is effected by reaction with hydrobromic acid in acetic acid, and the resulting dihydrobromide is neutralized, then coupled with carbobenzoxyproline p-nitrophenyl ester, thus producing carbobenzoxyprolylphenylalanylhistidine methyl ester. Reaction of that ester in methanol with hydrazine affords the corresponding hydrazide, which is coupled by the "azide" method with leucylleucine methyl ester hydrobromide, obtained from the dicyclohexylcarbodiimide coupling of carbobenzoxyleucine with leucine methyl ester hydrochloride, to yield carbobenzoxyprolylphenylalanylhistidylleucylleucine methyl ester. The "azide" procedure involves the in situ formation of a carboxylic acid azide from the corresponding hydrazide, followed by the addition of the amino acid component containing a free amino group. In the conduct of the present invention, an improvement of the general "azide" method has been developed, whereby the usual difficulties are eliminated and higher yields are obtained. The particularly preferred operating conditions involve the use of dimethylformamide as the principal solvent, formation of the azide under non-aqueous conditions by utilizing an isoamyl nitrite-hydrogen chloride reagent, liberation of the amino acid ester from its salt in situ, and maintenance of the reaction temperature between —20° and —40° C. The products are conveniently obtained by dilution of the reaction mixture with water.

Coupling of carbobenzoxyvalyltyrosine hydrazide with the appropriate serine ester by the "azide" process results in the corresponding ester of carbobenzoxyvalyltyrosylserine. A specific example is the preparation of carbobenzoxyvalyltyrosylserine p-nitrobenzyl ester by the utilization of serine p-nitrobenzyl ester. The carbobenzoxy group is removed by reaction with hydrogen bromide in trifluoroacetic acid, and neutralization of the resulting

hydrobromide affords valyltyrosylserine p-nitrobenzyl ester, which is coupled by the "azide" method with carbobenzoxyprolylphenylalanylhistidylleucylleucine hydrazide, obtained by reaction with hydrazine of the aforementioned corresponding methyl ester, to produce carbobenzoxyprolylphenylalanylhistidylleucylleucylvalyltyrosylserine p-nitrobenzyl ester.

The invention will appear in further detail from a consideration of the following examples. These examples are given for the purpose of illustration only and are not to be construed as limiting the invention either in spirit or in scope. In these examples, temperatures are given in degrees centigrade (° C.) and materials in parts by weight unless otherwise noted. The solvent system used for the paper chromatograms is n-butyl alcohol-acetic acid-water in the ratio of 7:1:2 by volume. The thin layer chromatograms are run on silica utilizing methanol-chloroform mixtures as the developing solvent. The optical rotation determinations are conducted in methanol.

Example 1

To a cold solution of 15 parts of N-carbobenzoxy-L-phenylalanine and 12.4 parts of dicyclohexylcarbodiimide in 150 parts of chloroform is added a cold solution of 14.2 parts of L-histidine methyl ester dihydrochloride and 12.3 parts of triethylamine in 150 parts of chloroform. The resulting reaction mixture is stirred at 0–5° for about one hour, then at room temperature for about 16 hours. Removal by filtration of the dicyclohexylurea formed affords a chloroform solution, which is washed successively with water, dilute aqueous potassium carbonate, and water, then dried over anhydrous magnesium sulfate and stripped of solvent by distillation at reduced pressure. The resulting residue is extracted into methanol, and the extract is filtered in order to remove dicyclohexylurea. The resulting filtrate is concentrated to a small volume by two codistillations with ethyl acetate, and the resulting solution is cooled to afford needle-like crystals of carbobenzoxyphenylalanylhistidine methyl ester (all L), melting at about 130–133° and characterized further by an optical rotation of —13°. The purity of this substance is further established by the presence of a single spot, having an $R_f$ value of 0.73, on its paper chromatogram. The chromatographic methods used are those described by D. Bolling et al., Federation Proc., 8, 185 (1949), and R. H. Mazur et al., J. Biol. Chem., 237, 1619 (1962).

The product of this example can be represented by the following structural formula

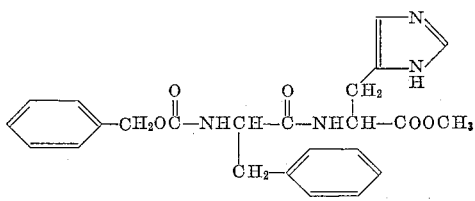

Example 2

To a solution of 26.3 parts of N-carbobenzoxyphenylalanylhistidine methyl ester (all L) in 105 parts of acetic acid is added, at about 10°, 48 parts by volume of a 4.9 Molar hydrogen bromide in acetic acid solution, and the resulting reaction mixture is stirred at room temperature for about one hour, then is poured slowly into approximately 700 parts of ether. The resulting precipitate is collected by filtration, washed several times on the filter with ether, and dried to yield phenylalanylhistidine methyl ester dihydrobromide (all L). Its paper chromatogram displays a single spot having an $R_f$ value of 0.29.

Example 3

To a solution of 10 parts of phenylalanylhistidine methyl ester dihydrobromide (all L) and 7.8 parts of carbobenzoxy-L-proline p-nitrophenyl ester in 80.4 parts of methylene chloride is added 4.5 parts of triethylamine, and the resulting solution is allowed to stand at room temperature for about 24 hours, then is washed successively with water, cold dilute aqueous potassium hydroxide, and water, dried over anhydrous magnesium sulfate and stripped of solvent at reduced pressure. The solid residue is slurried with ethyl acetate to afford the desired crude peptide, melting at about 150–153°. Purification by recrystallization from methanol-ethyl acetate affords pure N-carbobenzoxyprolylphenylalanylhistidine methyl ester (all L), melting at about 155–159°. This substance displays an optical rotation of −72° and is further characterized by a single spot on its paper chromatogram having an $R_f$ value of 0.79.

Example 4

To a solution of 22.6 parts of N-carbobenzoxyprolylphenylalanylhistidine methyl ester (all L) in 240 parts of methanol is added 20.2 parts of hydrazine, and the resulting reaction mixture is stored at room temperature for about 16 hours, then concentrated to a small volume at reduced pressure and diluted with water. The resulting precipitate is collected by filtration to afford the crude hydrazide, melting at about 140–150°. Purification by recrystallization from methanol-ethyl acetate affords pure N-carbobenzoxyprolylphenylalanylhistidine hydrazide (all L), which displays a melting point at about 153–157° and is further characterized by an optical rotation of −67°. This substance is represented by the structural formula

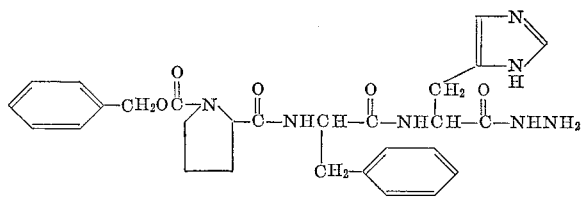

Example 5

A solution of 142.5 parts of carbobenzoxy-L-leucine and 96.4 parts of L-leucine methyl ester hydrochloride in 2010 parts of methylene chloride is cooled with stirring to 0–5°, and 56.2 parts of triethylamine followed by a solution of 113.3 parts of dicyclohexylcarbodiimide in 670 parts of methylene chloride is added at such a rate that the temperature is maintained below 15°. The resulting reaction mixture is stirred for about 2 hours longer at 0–5°, then is allowed to stand at room temperature for about 16 hours. Filtration of that mixture to remove the dicyclohexylurea by-product affords an organic solution, which is washed successively with water, dilute aqueous potassium carbonate, and water, then dried over anhydrous magnesium sulfate and stripped of solvent at reduced pressure. Recrystallization of the crude product from cyclohexane yields needle-like crystals of carbobenzoxyleucylleucine methyl ester (all L), melting at about 93–95°. It is characterized further by an optical rotation of −40° and by a single spot, having an $R_f$ value of 0.57, on its thin layer chromatogram. This compound is represented by the following structural formula

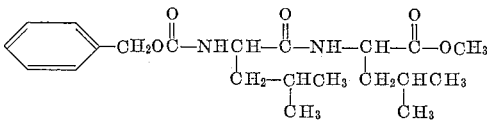

Example 6

To a solution of 10 parts of N-carbobenzoxyleucylleucine methyl ester (all L) in 10.5 parts of acetic acid is added 30 parts by volume of a 3.6 Molar hydrogen bromide in acetic acid solution, and the resulting mixture is stored at room temperature for about one hour, then is concentrated to dryness by distillation at reduced pressure. Trituration of the residue with ether followed by thorough washing with ether affords needle-like crystals of the crude product, melting at about 175–180°. Recrystallization from 1:1 ether-isopropyl alcohol results in pure leucylleucine methyl ester hydrobromide (all L), melting at about 181–184°. It displays an optical rotation of −40° and can be represented by the following structural formula

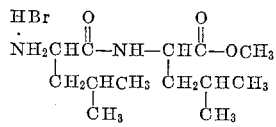

Example 7

To a solution of 5 parts of carbobenzoxyprolylphenylalanylhistidine hydrazide (all L) in 23.8 parts of dimethylformamide, at −40°, is added successively 18.3 parts of a 2 Molar hydrogen chloride in tetrahydrofuran solution and 1.24 parts of isoamyl nitrite. After that mixture has stood at −40° for about 30 minutes, 5 parts of triethylamine followed by a solution of 3.26 parts of leucylleucine methyl ester hydrobromide (all L) in 23.8 parts of dimethylformamide are added. That reaction mixture is stirred at about −40° for about 30 minutes, then is stored at about −18° for about 2 days, and is finally diluted with approximately 500 parts of water to afford the crude pentapeptide as an amorphous solid. Crystallization of that solid product from ether-isopropyl alcohol affords pure N-carbobenzoyprolylphenylalanylhistidylleucylleucine methyl ester (all L), melting at about 110–115° and characterized also by an optical rotation of −72°. It is further characterized by the following structural formula

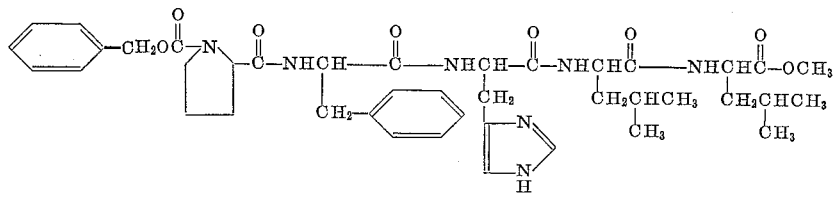

Example 8

To a solution of 6.18 parts of N-carbobenzoxyprolylphenylalanylhistidylleucylleucine methyl ester (all L) in 40 parts of methanol is added 8.24 parts of hydrazine hydrate, and the resulting reaction mixture is stored at room temperature for about 16 hours, then is diluted with approximately 500 parts of water. The resulting precipitate is isolated by filtration, then is crystallized from methanol to afford the crude product, melting at about 190–202°. Recrystallization from methanol affords pure N-carbobenzoxyprolylphenylalanylhistidylleucylleucine hydrazide (all L), which displays a melting point at about 203.5–206° and an optical rotation of −66°. The thin layer chromatogram of this substance displays a single spot, having an $R_f$ value of 0.28. A structural representation of this substance is shown below.

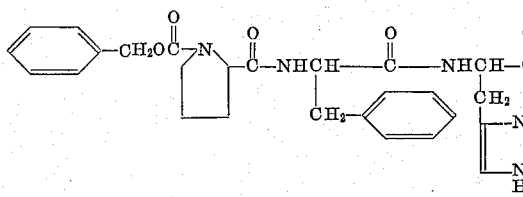

Example 9

A suspension of 10.51 parts of L-serine, 95 parts of p-toluenesulfonic acid monohydrate, and 76.5 parts of p-nitrobenzyl alcohol in 450 parts of chloroform is slowly distilled for about 6 hours, during which time the distillate is returned to the reaction mixture after passing through a bed of calcium sulfate. The mixture is then cooled, concentrated to a small volume under reduced pressure and diluted with ether, resulting in precipitation of the crude product. Recrystallization from isopropyl alcohol affords needle-like crystals of pure L-serine p-nitrobenzyl ester p-toluenesulfonate, melting at about 158–168°.

Example 10

To a solution of 4.28 parts of carbobenzoxyvalyltyrosine hydrazide (all L) and 25 parts by volume of 2 Molar hydrogen chloride in tetrahydrofuran dissolved in 28.5 parts of dimethylformamide is added, at −40°, 1.4 parts of isoamyl nitrite. After standing for about 10 minutes at −45° to −30°, 10.2 parts of triethylamine and a solution of 4.95 parts of L-serine p-nitrobenzyl ester p-toluenesulfonate in 9.5 parts of dimethylformamide are successively added. That reaction mixture is stored at −18° for about 3 days, then is diluted with about 500 parts of ice water to afford the crude product, melting at about 185–190°. The single spot obtained on a thin layer chromatogram has an $R_f$ value of 0.58. Purification of that crude product by recrystallization from methanol affords needle-like crystals of N-carbobenzoxyvalyltyrosylserine p-nitrobenzyl ester (all L), which displays a melting point at about 196–198° and an optical rotation of −28°. It can be represented by the following structural formula

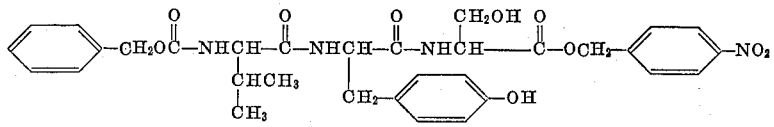

Example 11

Into a solution of 7.92 parts of N-carbobenzoxyvalyltyrosylserine p-nitrobenzyl ester (all L) in 100 parts of trifluoroacetic acid, cooled to about 0°, is bubbled hydrogen bromide for about one hour. The reaction mixture is concentrated to dryness by distillation at reduced pressure, and the resulting residue is extracted with water. The aqueous extract is washed with ether, then is concentrated to a small volume and adjusted to pH 8.5 by the addition of dilute aqueous potassium carbonate. The resulting crystalline precipitate is collected by filtration to afford pure valyltyrosylserine p-nitrobenzyl ester (all L), melting at about 78–90° and displaying an optical rotation of +22°. A thin layer chromatogram of this substance exhibits a single spot having an $R_f$ value of 0.51. This compound can be represented by the structural formula

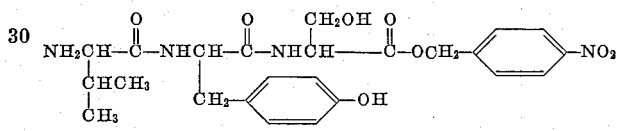

Example 12

A solution of 3.97 parts of N-carbobenzoxyprolylphenylalanylhistidylleucylleucine hydrazide (all L) in 21.9 parts of dimethylformamide containing 10 parts by volume of 2 Molar hydrogen chloride in tetrahydrofuran is cooled to about −40°, and 0.7 part of isoamyl nitrite is added. This mixture is stirred at about −40° for about 30 minutes, after which time 2 parts of triethylamine and 2.76 parts of valyltyrosylserine p-nitrobenzyl ester (all L) are added successively. The resulting reaction mixture is stirred at about −40° for about 2 hours, then is stored at about −18° for about 2 days. Filtration of that mixture affords an organic solution which is diluted with approximately 200 parts of ice water, and the resulting precipitate is collected by filtration. This substance is characterized by a single spot, having an $R_f$ value of 0.69, in its thin layer chromatogram. Purification by recrystallization from methanol affords pure N-carbobenzoxyprolylphenylalanylhistidylleucylleucylvalyltyrosylserine p-nitrobenzyl ester (all L), which displays a melting point at about 217–220° with decomposition and an optical rotation of −26°. It structural formula is shown below.

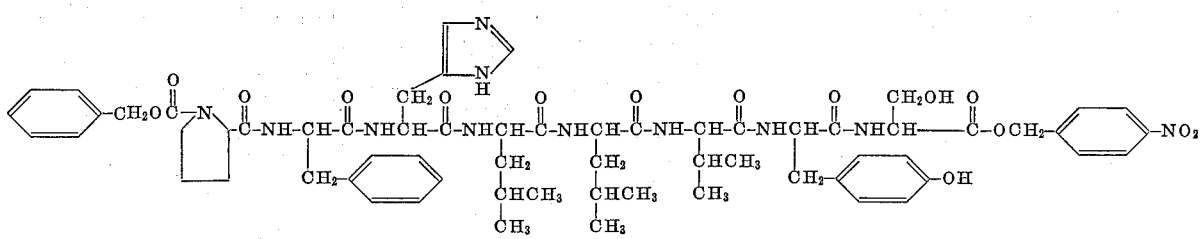

Example 13

The substitution of 64 parts of benzyl alcohol in the procedure of Example 9 results in L-serine benzyl ester p-toluenesulfonate.

Example 14

By substituting 69 parts of o-methoxybenzyl alcohol and otherwise proceeding according to the processes described in Example 9, L-serine o-methoxybenzyl ester p-toluenesulfonate is obtained.

Example 15

The esterification of L-serine with 82.5 parts of m-acetylaminobenzyl alcohol by the procedure described in Example 9 results in L-serine m-acetylaminobenzyl ester p-toluenesulfonate.

Example 16

When 75.5 parts of p-dimethylaminobenzyl alcohol is substituted for p-nitrobenzyl alcohol in the procedure of Example 9, L-serine p-dimethylaminobenzyl ester di-p-toluenesulfonate is obtained.

Example 17

The substitution of an equivalent quantity of L-serine benzyl ester p-toluenesulfonate in the procedure of Example 10 results in N-carbobenzoxyvalyltyrosylserine benzyl ester (all L).

Example 18

By substituting an equivalent quantity of N-carbobenzoxyvalyltyrosylserine benzyl ester (all L) and otherwise proceeding according to the processes of Example 11, valyltyrosylserine benzyl ester (all L) is obtained.

Example 19

The substitution of an equivalent quantity of valyltyrosylserine benzyl ester (all L) in the processes described in Example 12 results in N-carbobenzoxyprolylphenylalanylhistidylleucylleucylvalyltyrosylserine benzyl ester (all L).

Example 20

The substitution of an equivalent quantity of L-serine o-methoxybenzyl ester in the processes described in Example 10 results in N-carbobenzoxyvalyltyrosylserine o-methoxylbenzyl ester (all L).

Example 21

When an equivalent quantity of N-carbobenzoxyvalyltyrosylserine o-methoxybenzyl ester (all L) is substituted in the procedure of Example 11, valyltyrosylserine o-methoxybenzyl ester (all L) is obtained.

Example 22

The substitution of an equivalent quantity of valyltyrosylserine o-methoxylbenzyl ester (all L) in the procedure of Example 12 results in N-carbobenzoxyprolylphenylalanylhistidylleucylleucylvalyltyrosylserine o-methoxybenzyl ester (all L).

Example 23

By substituting an equivalent quantity of L-serine m-acetylaminobenzyl ester and otherwise proceeding according to the processes of Example 10, N-carbobenzoxyvalyltyrosylserine m-acetylaminobenzyl ester (all L) is obtained.

Example 24

When an equivalent quantity of N-carbobenzoxyvalyltyrosylserine m-acetylaminobenzyl ester (all L) is substituted in the procedure of Example 11, valyltyrosylserine m-acetylaminobenzyl ester (all L) is obtained.

Example 25

The substitution of an equivalent quantity of valyltyrosylserine m-acetylaminobenzyl ester (all L) in the procedure of Example 12 results in N-carbobenzoxyprolylphenylalanylhistidylleucylleucylvalyltyrosylserine m-acetylaminobenzyl ester (all L).

Example 26

By substituting an equivalent quantity of L-serine p-dimethylaminobenzyl ester and otherwise proceeding according to the processes described in Example 10, N-carbobenzoxyvalyltyrosylserine p-dimethylaminobenzyl ester (all L) is obtained.

Example 27

The substitution of an equivalent quantity of N-carbobenzoxyvalyltyrosylserine p-dimethylaminobenzyl ester (all L) in the procedure of Example 11 results in valyltyrosylserine p-dimethylaminobenzyl ester (all L).

Example 28

When an equivalent quantity of valyltyrosylserine p-dimethylaminobenzyl ester (all L) is substituted in the procedure of Example 12, N-carbobenzoxyprolylphenylalanylhistidylleucylleucylvalyltyrosylserine p-dimethylaminobenzyl ester (all L) is obtained.

What is claimed is:

1. An ester of the free carboxylic acid group of N-carbobenzoxyprolylphenylalanylhistidylleucylleucylvalyltyrosylserine (all L), wherein the hydroxylic residue is represented by the formula

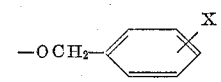

X being selected from the group consisting of hydrogen and radicals of the class consisting of methoxy, nitro, dimethylamino, and acetylamino.

2. N-carbobenzoxyprolylphenylalanylhistidylleucylleucylvalyltyrosylserine p-nitrobenzyl ester (all L).

3. N-carbobenzoxyprolylphenylalanylhistidine hydrazide (all L).

4. N-carbobenzoxyprolylphenylalanylhistidylleucylleucine hydrazide (all L).

References Cited by the Examiner
FOREIGN PATENTS
108,204  9/1958  Pakistan.

References Cited by the Applicant
H. Hochstrasser and J. R. Kahn, Federation Proc., 22, 542 (1963).

LEWIS GOTTS, *Primary Examiner.*

PERRY A. STITH, *Assistant Examiner.*